United States Patent
Kim

(10) Patent No.: US 6,400,406 B1
(45) Date of Patent: *Jun. 4, 2002

(54) DEVICE AND METHOD FOR DISPLAYING BROADCAST PROGRAM GUIDE IN A PROGRAMMED RECORDING SYSTEM

(75) Inventor: Jin-hwi Kim, Suwon (KR)

(73) Assignee: Samsung Electronics, Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/878,070

(22) Filed: Jun. 18, 1997

(30) Foreign Application Priority Data

Jun. 28, 1996 (KR) .......................................... 96-25203

(51) Int. Cl.⁷ ............................ H04N 7/173; H04N 7/16
(52) U.S. Cl. ...................... 348/460; 348/906; 348/552; 348/553; 348/564; 725/58; 725/116
(58) Field of Search ................................ 348/460, 906, 348/564, 552, 553, 563, 569, 12, 13, 6, 7, 10; 455/5.1, 4.2, 6.1, 6.2, 6.3; 725/58, 116; H04N 5/445, 7/16, 7/173

(56) References Cited

U.S. PATENT DOCUMENTS

| | | | | |
|---|---|---|---|---|
| 5,446,488 A | * | 8/1995 | Vogel | 348/460 |
| 5,481,296 A | * | 1/1996 | Cragun et al. | 348/13 |
| 5,541,738 A | * | 7/1996 | Mankovitz | 348/460 |
| 5,552,833 A | * | 9/1996 | Henmi et al. | 348/460 |
| 5,585,838 A | * | 12/1996 | Lawler et al. | 348/906 |
| 5,585,866 A | * | 12/1996 | Miller et al. | 348/906 |
| 5,592,551 A | * | 1/1997 | Lett et al. | 348/906 |
| 5,635,989 A | * | 6/1997 | Rothmuller | 348/906 |
| 5,652,613 A | * | 7/1997 | Lazarus et al. | 348/460 |
| 5,661,526 A | * | 8/1997 | Hamamoto et al. | 348/460 |
| 5,686,954 A | * | 11/1997 | Yoshinobu et al. | 348/460 |
| 5,699,107 A | * | 12/1997 | Lawler et al. | 348/13 |
| 5,726,702 A | * | 3/1998 | Hamaguchi et al. | 348/906 |
| 5,751,372 A | * | 5/1998 | Forson | 348/906 |
| 5,758,259 A | * | 5/1998 | Lawler | 455/5.1 |
| 5,786,869 A | * | 7/1998 | Baek et al. | 348/569 |
| 5,793,438 A | * | 8/1998 | Bedard | 348/569 |
| 5,805,230 A | * | 9/1998 | Staron | 348/460 |
| 5,805,763 A | * | 9/1998 | Lawler et al. | 348/13 |
| 5,808,608 A | * | 9/1998 | Young et al. | 348/906 |
| 5,812,205 A | * | 9/1998 | Milnes et al. | 348/460 |

* cited by examiner

Primary Examiner—John W. Miller
Assistant Examiner—Jean W. Désir
(74) Attorney, Agent, or Firm—Dilworth & Barrese, LLP

(57) ABSTRACT

A device and method for displaying a broadcast program guide in a broadcast programmed recording system (referred to as immediate-K), wherein the method includes the steps of (a) loading a plurality of packets containing broadcast information among successively input data to periodically separate the broadcast program information therefrom, (b) comparing a current time with the start or end time of a next program from the broadcast program information separated in the step (a), and (c) displaying information of the broadcast program on a screen if the start or end time of the next program is a predetermined time later than the current time as a result of the step (b). The device includes a code extractor which periodically extracts the broadcast program information, a storage device which stores the extracted information and a controller which compares the current time with the start or end time of the next program and causes the broadcast information to be displayed if the start or end time of the next program is a predetermined time later than the current time. Thus, a viewer is automatically informed of an upcoming broadcast program by the display of the broadcast information of the program a predetermined time before the program starts.

5 Claims, 3 Drawing Sheets

| TDP | | | DISP DATA | | | | OTHER CODES | | | | | TITLE |
|---|---|---|---|---|---|---|---|---|---|---|---|---|
| TLEN | rsd | TITLE/DISP DATA POINT | HOUR | MINUTE | HOUR | MINUTE | TYPE | LDW | CAP | STE/MON | SORT | 14 CHARAC-TERS |
| 4 | 2 | 8 | 5 | 6 | 5 | 6 | 1 | 7 | 1 | 3 | 8 | |
| 14 BITS | | | 11 BITS | | 11 BITS | | 20 BITS | | | | | 28 BYTES |

| CURRENT DATE/TIME | | | | | | | | ON-AIR ID | | |
|---|---|---|---|---|---|---|---|---|---|---|
| YEAR | MONTH | DAY | HOUR | MINUTE | SECOND | LVI | rsd | Local | Main_ID | Sub_ID |
| 7 | 4 | 5 | 5 | 6 | 6 | 2 | 7 | 1 | 8 | 5 |
| 33 BITS | | | | | | 2 BITS | 7 BITS | 14 BITS | | |

DEVICE AND METHOD FOR DISPLAYING BROADCAST PROGRAM GUIDE IN A PROGRAMMED RECORDING SYSTEM

BACKGROUND OF THE INVENTION

The present invention relates to a device and method for displaying a broadcast program guide in a broadcast programmed recording system (hereinafter, the broadcast programmed recording system is referred to as immediate-K). More particularly, the present invention relates to a device and method for displaying information of a next broadcast program on a screen by processing immediate-K data.

Generally, a user must set a current time, the start and end time of a program, and a broadcast channel in a video cassette recorder (VCR) in order to perform a TV programmed recording.

An immediate-K system, which refers to a Korean Broadcast Programming System (KBPS), enables simpler and more accurate programmed recording than a currently used G-code programmed recording, allows easy search of weekly program information through a television without using a newspaper or magazine, and supplies much information including the current time.

In addition, when a broadcast station sends program-related information in packet units through 16 lines in a vertical blanking period, a viewer can search program information or perform a programmed recording by simple manipulation of a remote controller, using a VTR having an immediate-K function.

FIG. 1 illustrates an example of programs displayed on a screen using immediate-K data.

FIG. 2 illustrates an example of other programs displayed on the screen using the immediate-K data.

When a VCR tunes a channel in a normal state for receiving a broadcast signal, the immediate-K data loaded on the broadcast signal can be received. The immediate-K data, usually stored in a DRAM, is displayed as broadcast information on a screen when a user inputs an immediate-K key, as shown in FIG. 1, so that the user can confirm broadcast programs according to their time slots. Further, to confirm broadcast programs of another broadcast station as shown in FIG. 2, the user changes the channel by inputting a channel up/down key.

In the above conventional broadcast program confirming method, the user is likely to forget the procedure of displaying future programs, and may have difficulty in remembering all the programs of several broadcast stations, thereby missing an intended program.

SUMMARY OF THE INVENTION

The object of the present invention is to provide a broadcast program guide displaying device and method which enable a user to automatically confirm an intended program to be played by displaying program information of another broadcast station a predetermined time before the intended program starts while the user is viewing a program of a specific broadcast station.

To achieve the above object, there is provided a device for displaying a program guide message in a broadcast programmed recording system, comprising: a code extracting portion for periodically extracting broadcast program information from a plurality of predetermined data formats; a storing portion for storing the broadcast program information extracted in the code extracting portion; and a controlling portion for comparing a predetermined time read from the storing portion with a predetermined time of a next program, and displaying information of the broadcast program on a screen if it is within the predetermined time before the next program starts.

To achieve the above object, there is also provided a method for displaying a broadcast program guide message, comprising the steps of: (a) loading a plurality of packets containing broadcast information among successively input data task to periodically separate the broadcast program information therefrom; (b) comparing a current time with the start or end time of a next program from the broadcast program information separated in the step (a); and (c) displaying information of the broadcast program on a screen if the start or end time of the next program is a predetermined time later than the current time as a result of the step (b).

BRIEF DESCRIPTION OF THE DRAWINGS

The above object and advantages of the present invention will become mores apparent by describing in detail preferred embodiments thereof with reference to the attached drawings in which.

DETAILED DESCRIPTION OF THE INVENTION

Figure 1:
FIG. 1 illustrates an example of programs displayed on a screen with application of immediate-K data.
Figure 2:
FIG. 2 illustrates another example of programs displayed on a screen with application of the immediate K-data.
Figures 3, 4, 5:
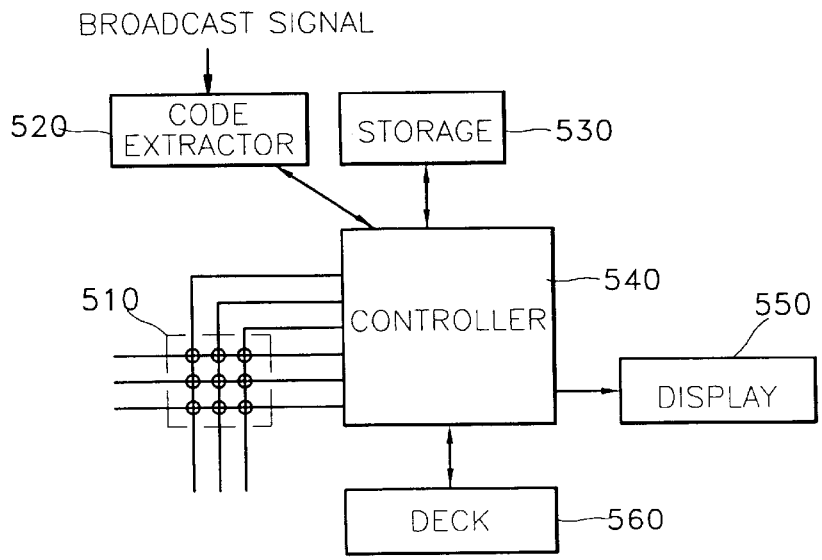
FIG. 3 illustrates the format of packet 7 which contains programming data among the immediate-K data.
FIG. 4 illustrates the format of packet 1 which contains current time data among the immediate-K data.
FIG. 5 is a block diagram of a broadcast program guide displaying device in a broadcast programmed recording system according to the present invention.

Referring to FIG. 3, the format of packet 7 which contains programming data among immediate-K data includes 14-bit title display data (TDP), 22-bit display data (DISP DATA), 20-bit other codes including 7-bit day data, and 28-byte title data. Information of the titles of programs is recorded in the TDP and information of the start and end time of a program is recorded in the DISP DATA. In the "other codes" section, there is recorded additional information such as a type for discriminating broadcast areas, serial program link display data (LDW) which is day mapping information, stereo/mono data, caption data, and sort data for discriminating a program type.

FIG. 4 illustrates the format of packet 1 which contains current program data among the immediate-K data. The packet 1 format has 42-bit current data/time data and 14-bit data representing the identity number (ON-AIR ID) of a current broadcast program. The current day/time data includes information of the year, month, date, hour, minute, second, LVI, and reserved (rsd), and the ON-AIR ID includes information of locality (Local) and the main identity number (Main_ID) & sub identity number (Sub_ID) of a program.

FIG. 5 is a block diagram of a broadcast program guide display device in a broadcast programmed recording system according to the present invention.

The device of FIG. 5 includes a key input unit 510 having a plurality of function keys, for interfacing with a user, a code extractor 520 for periodically extracting broadcast program information of the immediate-K data, a storage 530 for storing the immediate-K broadcast program information extracted in the code extractor 520, a display 550 for displaying program information on a screen, a controller 540 for receiving information of the plurality of keys, comparing the start time of a stored broadcast program with a current time, and displaying information related to the broadcast program on the display 550, and a deck 560 which is a mechanism for implementing the recording and reproducing operations under the direction of the controller 560.

Figure 6:
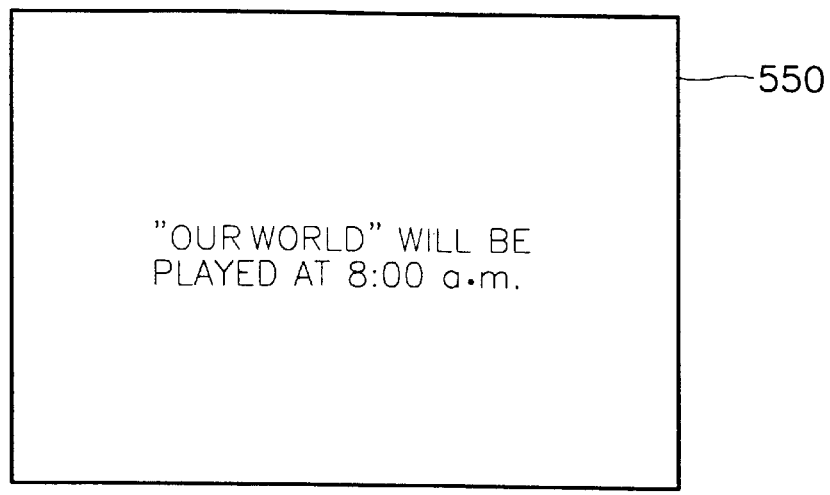
FIG. 6 illustrates messages displayed on the screen of FIG. 5.

FIG. 6 illustrates a message displayed on the screen 550 of FIG. 5. Five minutes before a current program ends (which is before the next program starts), a next program guide message is displayed on the lower portion of the display 550.

Figure 7:
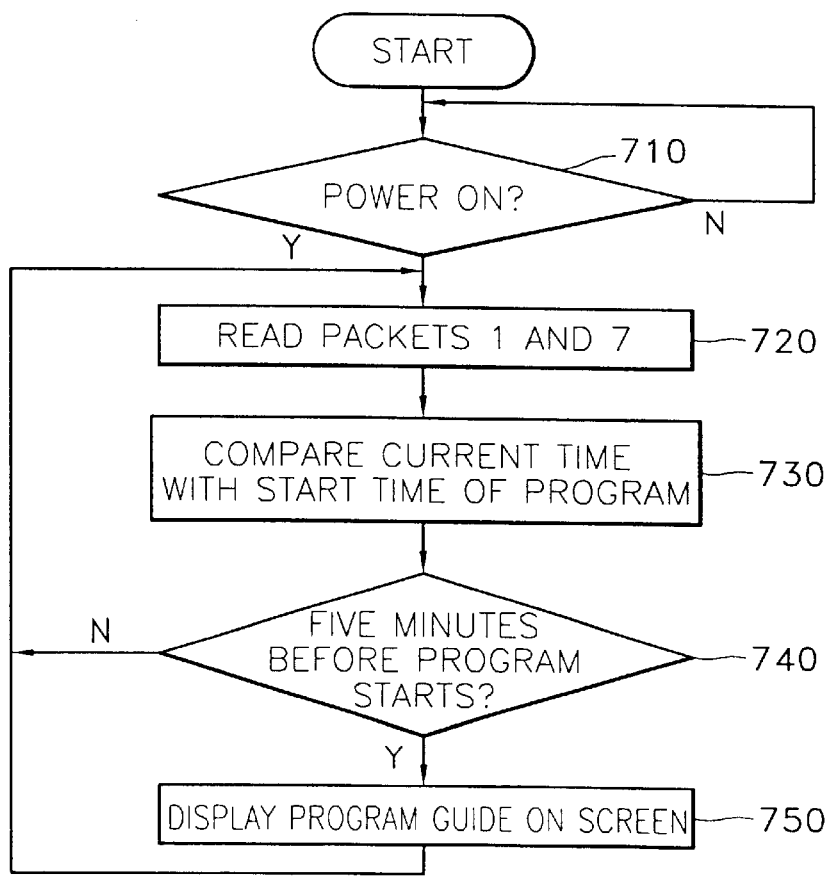
FIG. 7 illustrates a flowchart for performing a broadcast program guide displaying method in a broadcast programmed recording system adopting the device shown in FIG. 5.

FIG. 7 illustrates a flowchart for performing a broadcast program guide displaying method in a broadcast programmed recording system adopting the device of FIG. 5.

In step 710, it is determined whether power is on. In step 720, packets 1 and 7 are read. In step 730, a current time and the start time of a next program are analyzed. In step 740, it is determined whether it is five minutes before the start time of the next program. In step 750, a program guide message is displayed on a screen.

A preferred embodiment of the present invention will be described with reference to FIGS. 3–7.

As shown in FIG. 5, KBPS data sent together with a video signal from a broadcast station is input to the code extractor 520 through an antenna (not shown). In step 710, the controller 540 determines whether the power to the system is on. If the power is on, packets 1 and 7 contained in the broadcast signal are extracted, and the time data included in the packet 1 and data of the start and end time and title of a next program and the name of a broadcast station included in the packet 7, are separated in step 720.

The controller 540 separates the time data of the packet divided in the code extractor 520 into year, month, day, hour, minute, and second, and stores the extracted data in the storage 530 every second. Also, every second the controller 540 stores in the storage device 530 the start and end time of the program, the title of the program and the name of the broadcast station extracted from the packet 7.

In step 730, the controller 540 reads data of the start time of a next broadcast program stored in the storage 530 at a predetermined time interval (for example, every second), upon input of a key signal of a program guide message display function from the key input 510, and compares the read data with stored current time data.

The controller 540 compares the start time of the next program read from a current packet 7 with a current time. If the start time is not more than a specific time (for example, five minutes) later than the current time, the procedure goes back to step 720 of FIG. 7, in which packets 1 and 7 are extracted again. If the start time is not more than the specific time (five minutes) later than the current time, the controller 540 reads information of the start time, the name of its broadcast station, and the title of the next program from among information of the next broadcast program included in the packet 7. In step 750, the controller 540 displays the title of the next broadcast program which will be on the air five minutes later. For example, "Our World", and its start time "8:00 a.m." are displayed on the display 550, as shown in FIG. 6. As shown in FIG. 6, a message "Our World will be played at 8:00 a.m." is displayed on the lower portion or a predetermined portion of the display 550. Therefore, the viewer is informed of the start time and title of the next program five times before it starts, about the time when the current program ends. Programming and recording in a VCR is mechanically implemented by the deck 560 in response to a control signal of the controller 540.

As described above, according to the present invention, a VCR or TV viewer is automatically informed of an upcoming broadcast program which will be played by displaying information of the program five minutes before the program starts while the viewer is viewing another broadcast program.

What is claimed is:

1. A device for automatically displaying a broadcast program guide message for a program at a predetermined time prior to broadcast of the program in a broadcast programmed recording system, said program guide message being displayed independent of a user actively setting a program reminder, comprising:

a code extracting portion for periodically extracting broadcast program information from a received broadcast signal, said received broadcast signal being one of a plurality of predetermined data formats;

a storing portion for storing the broadcast program information extracted in said code extracting portion;

a controlling portion for comparing a current time read from said storing portion with a starting time of a next broadcast program as extracted from the broadcast program information and automatically displaying information of the next broadcast program on a screen if a difference between the current time and the starting time is less than a predetermined time.

2. A device for displaying a broadcast program guide message as claimed in claim 1, wherein the broadcast program information of said code extracting portion includes a current time, the start and end time and title of the broadcast program, and a name of a broadcast station.

3. A device for displaying a broadcast program guide message as claimed in claim 1, wherein said broadcast information is the starting time and title of the program.

4. A device for displaying a broadcast program guide message as claimed in claim 1, wherein the first time is a current time of said broadcast program information extracted from said plurality of predetermined data formats.

5. A method for automatically displaying a broadcast program guide message for a program at a predetermined time prior to broadcast of the program in a broadcast programmed recording system, said program guide message being displayed independent of a user actively setting a program reminder, comprising the steps of:

(a) extracting broadcast program information received as a plurality of packet units in a received broadcast signal, said plurality of packet units including a title of a next broadcast program, a broadcast station name, and time data corresponding to a start and end time of said next program;

(b) comparing a current time with one of the start time and the end time of the next broadcast program from the broadcast program information separated in said step (a); and (c) automatically displaying information of the next broadcast program on a display if it is determined in said step (b) that one of the start time and the end time of the next broadcast program is within a predetermined time form the current time.

* * * * *